`US010253737B2`

(12) United States Patent
Jokschas et al.

(10) Patent No.: US 10,253,737 B2
(45) Date of Patent: Apr. 9, 2019

(54) FILTER ELEMENT WITH MULTI-STAGE WATER-SEPARATING ACTION AND WITH BAYONET CONNECTION, AND FUEL FILTER HAVING A FILTER ELEMENT OF SAID TYPE

(71) Applicant: MANN+HUMMEL GMBH, Ludwigsburg (DE)

(72) Inventors: Guenter Jokschas, Murrhardt (DE); Martin Weindorf, Kornwestheim (DE); Martin Veit, Gaertringen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 15/180,050

(22) Filed: Jun. 12, 2016

(65) Prior Publication Data
US 2016/0317955 A1 Nov. 3, 2016

Related U.S. Application Data (63) Continuation of application No. PCT/EP2014/075471, filed on Nov. 25, 2014.

(30) Foreign Application Priority Data

| Dec. 12, 2013 | (DE) | 20 2013 011 849 U |
| Aug. 5, 2014 | (DE) | 10 2013 020 539 |
| Aug. 12, 2014 | (DE) | 10 2014 011 785 |

(51) Int. Cl.
*F02M 37/22* (2006.01)
*B01D 35/00* (2006.01)
(Continued)

(52) U.S. Cl.
CPC ............. *F02M 37/22* (2013.01); *B01D 29/21* (2013.01); *B01D 35/153* (2013.01); *B01D 35/16* (2013.01);
(Continued)

(58) Field of Classification Search
CPC .......... B01D 36/001; B01D 2201/4015; B01D 2201/295; B01D 2201/347;
(Continued)

(56) References Cited

U.S. PATENT DOCUMENTS 8,157,107 B2 * 4/2012 Weindorf ............. B01D 35/147
210/130
8,286,804 B2 10/2012 Weindorf
(Continued)

FOREIGN PATENT DOCUMENTS

| CN | 203227353 U | 10/2013 |
| DE | 102011106909 B3 * | 6/2012 | ........... B01D 35/147 |
| DE | 102011078362 A1 | 1/2013 |
| EP | 2201993 A1 * | 6/2010 | ............. B01D 29/96 |
| EP | 2201993 A1 | 6/2010 |

*Primary Examiner* — Terry K Cecil
(74) *Attorney, Agent, or Firm* — James Hasselbeck (57) ABSTRACT

Disclosed is a filter element (86) with multi-stage cleaning, and a fuel filter (84) having such a filter element (86). The filter element (86) has a particle filter medium, a coalescer medium, a sediment gap (98) and a final separator screen. The filter housing has a filter housing body (110) and a cover (106) screwed onto the filter housing body (110). When the cover (106) is unscrewed from the filter housing body (110), at least one bayonet projection (112) of the filter element (86) engages behind a corresponding bayonet receptacle (114), such that the cover (106) can be removed together with the filter element (86) arranged thereon by way of the bayonet connection.

9 Claims, 9 Drawing Sheets

(51) Int. Cl.
*B01D 36/00* (2006.01)
*B01D 29/21* (2006.01)
*B01D 35/153* (2006.01)
*B01D 35/16* (2006.01)

(52) U.S. Cl.
CPC ......... *B01D 36/001* (2013.01); *B01D 36/003* (2013.01); *F02M 37/221* (2013.01); *B01D 2201/0415* (2013.01); *B01D 2201/295* (2013.01); *B01D 2201/347* (2013.01); *B01D 2201/4015* (2013.01); *B01D 2201/4084* (2013.01)

(58) Field of Classification Search
CPC ............ B01D 2201/4084; B01D 35/16; B01D 35/153; F02M 37/22; F02M 37/221
See application file for complete search history.

(56) References Cited

U.S. PATENT DOCUMENTS

| | | | |
|---|---|---|---|
| 9,011,685 B2* | 4/2015 | Holker | F02M 37/221 210/232 |
| 2006/0186031 A1 | 8/2006 | Fick et al. | |
| 2007/0289915 A1 | 12/2007 | Jiang et al. | |
| 2008/0116126 A1* | 5/2008 | Greiving | B01D 29/21 210/167.08 |
| 2008/0245719 A1 | 10/2008 | Beard et al. | |
| 2009/0301950 A1* | 12/2009 | Weindorf | B01D 35/147 210/130 |
| 2011/0017657 A1 | 1/2011 | Jokschas et al. | |
| 2014/0284268 A1* | 9/2014 | Volkmer | B01D 36/003 210/493.2 |

* cited by examiner

FILTER ELEMENT WITH MULTI-STAGE WATER-SEPARATING ACTION AND WITH BAYONET CONNECTION, AND FUEL FILTER HAVING A FILTER ELEMENT OF SAID TYPE

TECHNICAL FIELD

The invention relates to a filter element for a fuel filter of a motor vehicle. The invention further relates to a fuel filter having a filter element of said type.

BACKGROUND

A filter element for filtering fuel in a motor vehicle is known from DE 10 2011 078 362 A1. The filter element has a particle filter medium and a final sepa-rating screen for separation of water. The separated water collects in a water collecting chamber.

Ventilation nozzles for a liquid filter are known from EP 1 356 199 B1.

US 2009/0301950 A1 discloses a filter element which can be fastened by means of a bayonet fitting on the cover of a filter housing.

EP 2 201 993 A1 also discloses fastening a replaceable filter element to a container of a filter housing by a bayonet fitting.

Finally, various possibilities for sealing a filter element to a channel of a filter housing are known from US 2011/0017657 A1.

As a result of considerably increased expectations with regard to the performance of internal combustion engines in motor vehicles, the requirements with regard to the purity and freedom from water of the fuel for use in the internal combustion engines increase dramatically. The fuel filters used for cleaning of the fuel in the motor vehicle must therefore have a plurality of cleaning stages, in particular a plurality of water separation stages, for cleaning of the fuel. However, due to the design the known multi-stage water separating filter elements are comparatively difficult to maintain. In particular the removal of a filter element to be replaced from a filter housing is complex, since the filter element to be replaced is generally completely recessed in the filter housing.

SUMMARY

Therefore the object of the invention is to provide a multi-stage water separating filter element as well as a fuel filter with such a filter element which are designed to be particularly easy to maintain.

Thus the object according to the invention is achieved by a filter element for a fuel filter of a motor vehicle, wherein the filter element can be inserted into a filter housing of the fuel filter and the filter element for multi-stage cleaning of a fuel has a particle filter medium, a coalescer medium, a sediment gap and a final separating screen, wherein furthermore the filter element has a bayonet projection which is designed to engage behind a bayonet receptacle in a cover of the filter housing.

The fuel is cleaned by the filter element in multiple stages. In this case particles in the fuel are separated off by the particle filter medium. Then, i.e. on the input side, a multi-stage water separating action takes place. In this case first of all relatively large drops of water form from fine water droplets in the coalescer medium. These drops of water sink in the sediment gap. Finally, the final separating screen acts as a baffle plate for further separation of water in the fuel.

If the filter element is replaced, a cover of the filter housing in which the filter element is arranged is unscrewed. When the cover is unscrewed the bayonet projection of the filter element engages behind the bayonet receptacle in the cover of the filter housing. The filter element can then be removed together with the cover. In other words, the cover of the filter housing serves as a grip for removal of the filter element. As a result the filter element according to the invention is designed to be particularly easy to maintain.

The filter element can have a plurality of bayonet projections which are designed to engage in respective bayonet receptacles in the cover of the filter housing. In other words the bayonet projections are designed for engagement behind bayonet receptacles on the inside of the cover. As a result the filter element can be retained particularly securely in the cover. In this case the bayonet projections are preferably formed axially symmetrically with respect to the longitudinal axis of the filter element.

A filter element which is of particularly simple design and as a result can be produced cost-effectively is obtained when the particle filter medium is arranged between a first end plate and a second end plate of the filter element. The coalescer medium, in particular also the final separating screen, is preferably also arranged between the two end plates.

The filter element preferably has a ventilation pipe extending along the longitudinal axis of the filter element. Air in the filter system can be discharged through the ventilation pipe. In this case the ventilation pipe can be designed in the form of a support pipe which projects beyond at least one end disc of the filter element in the direction of the longitudinal axis of the filter element. As a result an additional reinforcement of the filter element takes place simultaneously with simple fluidic contactability of the ventilation pipe.

The filter element can have a double seal towards the filter housing. In this case a double seal is understood to be at least two seals, for example O-ring seals and/or molded seals, for separating the output side and the input side of the filter element in the filter housing. In this case a first seal of the double seal is preferably formed or arranged so as to be offset in the longitudinal direction of the filter element with respect to a second seal of the double seal. In particular the double seal is arranged on an end plate of the filter element which is preferably arranged at the bottom in the installation position of the filter element.

In a preferred exemplary embodiment the double seal is designed in such a way that, with the filter element installed in a filter housing between the two seals, a region can be sealed into which for example a discharge channel of the filter system opens. The seals are preferably arranged in such a way that the region to be sealed forms an annular space around a (lower) end plate of the filter element.

The two seals of the double seal can preferably have in each case a circumferential, radially outwardly directed sealing surface which serves for sealing abutment on a radially inwardly directed inner housing wall. The radially outwardly directed sealing surfaces are preferably offset axially relative to one another. Alternatively or additionally the radially outwardly directed sealing surfaces are arranged at least almost coaxially relative to one another and/or have diameters of at least almost the same size. The size of the diameter of the radially outwardly directed sealing surfaces preferably at least largely corresponds to the size of the external circumference of the associated end plate and/or of the particle filter medium.

The filter element is designed for simultaneously simple and stable mounting preferably axially symmetrically with respect to the longitudinal axis of the filter element. In this case, first of all the filter element has, preferably in the radial direction when viewed from the longitudinal axis of the filter element, a ventilation pipe which is surrounded by the final separating screen. The rotationally symmetrical sediment gap preferably adjoins the final separating screen. The sediment gap is preferably delimited radially towards the outside by a support member of the filter element. The coalescer medium and the particle filter medium are preferably supported on the outer surface of the support member. The coalescer medium is preferably in the form of a nonwoven. The particle filter medium is preferably folded in a star shape.

Furthermore, the object according to the invention is achieved by a fuel filter with a filter housing and a previously described filter element, wherein the filter housing has a cover which can be screwed onto a filter housing member and the cover has on the inside a bayonet receptacle which is designed in such a way that the bayonet projection engages in the bayonet receptacle when the cover is unscrewed from the filter housing member.

The fuel filter preferably has a filter element with a plurality of bayonet projections which are designed in each case to engage behind a bayonet receptacle in the cover of the fuel filter when the cover is unscrewed from the filter housing.

The fuel filter can have at one end on the ventilation pipe a non-return valve which is designed in such a way that it shuts off in the event of the flow being interrupted. In this way with the internal combustion engine switched off, for example in the so-called start/stop operation, the fuel is held in the fuel filter and prevents air present in a tank return pipe from entering the internal combustion engine via the fuel filter. If the internal combustion engine is started, the necessary fuel pressure for an ignition impulse can be established immediately in the fuel filter. Thus the non-return valve enables short engine starting times, which is desirable in particular in start/stop operation.

The non-return valve is preferably fastened, in particular in a fluid-tight manner, in the fuel filter with a snap connection. As a result the non-return valve can be fitted particularly cost-effectively.

In a particularly preferred embodiment of the invention the non-return valve is fastened in the cover of the filter housing. When a filter element is changed, the non-return valve does not also have to be replaced in this case, thus avoiding waste and reducing maintenance costs.

The filter housing can have a drainage channel for discharging fuel which has accumulated on the input side during removal of the filter element from the filter housing. As a result a contamination of the fuel on the output side of the fuel filter is avoided during changing of the filter.

The drainage channel is preferably arranged or formed in such a way that during the removal of the filter element from the filter housing a first seal of the double seal seals the connection between the filter element and the filter housing on the output side of the fuel filter for longer than a second seal seals the connection between the filter element and the drainage channel on an input side of the fuel filter. As a result, when the filter element attached to the cover is pulled out of the filter housing, first of all the connection between the input side of the fuel filter and the drainage channel is opened, so that the fuel can flow off from the input side of the fuel filter via the drainage channel. Only then is the fluidic connection between the filter element and the filter housing to the first seal opened by pulling the filter element further out. As a result an unfiltered fuel overflow from the input side to the output side is securely avoided.

BRIEF DESCRIPTION OF THE DRAWINGS

Further features and advantages of the invention are disclosed by the following detailed description of a plurality of exemplary embodiments of the invention, with reference to the figures of the drawings, which show details which are essential to the invention, and also from the claims.

The features illustrated in the drawings are presented in such a way that the distinctive features according to the invention can be made clearly visible. The different features can each be implemented individually or in any combination in variants of the invention.

In the drawings.

DETAILED DESCRIPTION

Figure 1:
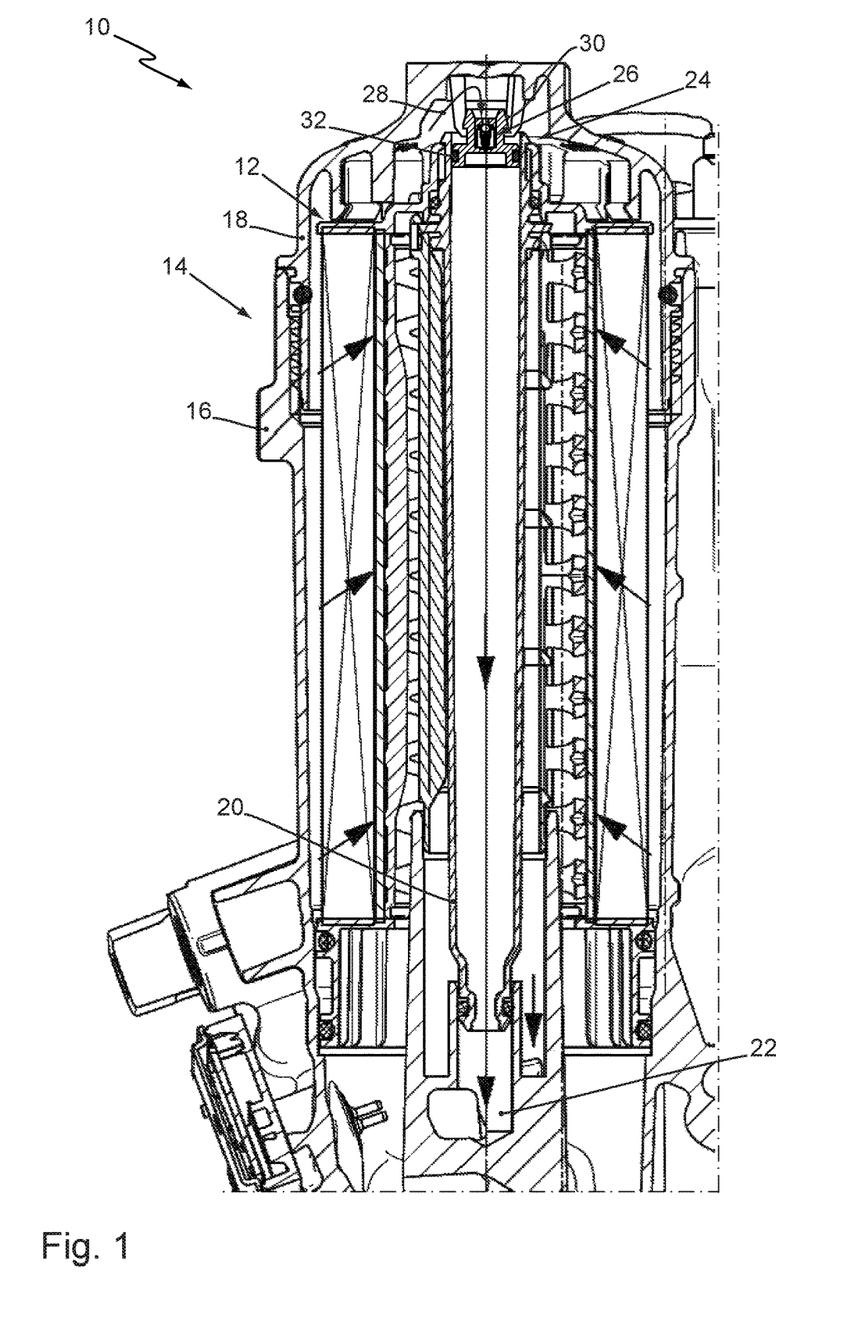
FIG. 1 shows a longitudinal section through a first fuel filter having a first filter element.

FIG. 1 shows a first fuel filter 10 with a first filter element 12 for multi-stage cleaning of a fuel. The first filter element 12 is arranged in a filter housing 14 of the first fuel filter 10. The filter housing 14 has a filter container or filter housing 16. A cover 18 of the filter housing 14 is screwed onto the filter housing 16.

The first filter element 12 has a ventilation pipe 20. By means of the ventilation pipe 20 air can be led out of the first fuel filter 10 via a return pipe 22 back into a tank (not shown). A non-return valve 26 is arranged at the end 24 of the ventilation pipe 20 opposite the return pipe 22. The non-return valve 26 opens with an overpressure of more than approximately 0.4 bar in the direction of the return pipe 22 or of an arrow 28. Thus the non-return valve 26 can be opened slightly in order to enable a fast discharge of the air from the first fuel filter 10. The outflow of the air takes place in the direction of the arrow 28. For ease of installation the non-return valve 26 is fastened in the cover 18 of the filter housing 14 by a snap connection 30. The non-return valve 26 prevents the fuel from running out of the first fuel filter 10 in the rest state of an internal combustion engine (not shown) fluidically connected to the first fuel filter 10. As a result the internal combustion engine can be started quickly.

Figure 2:
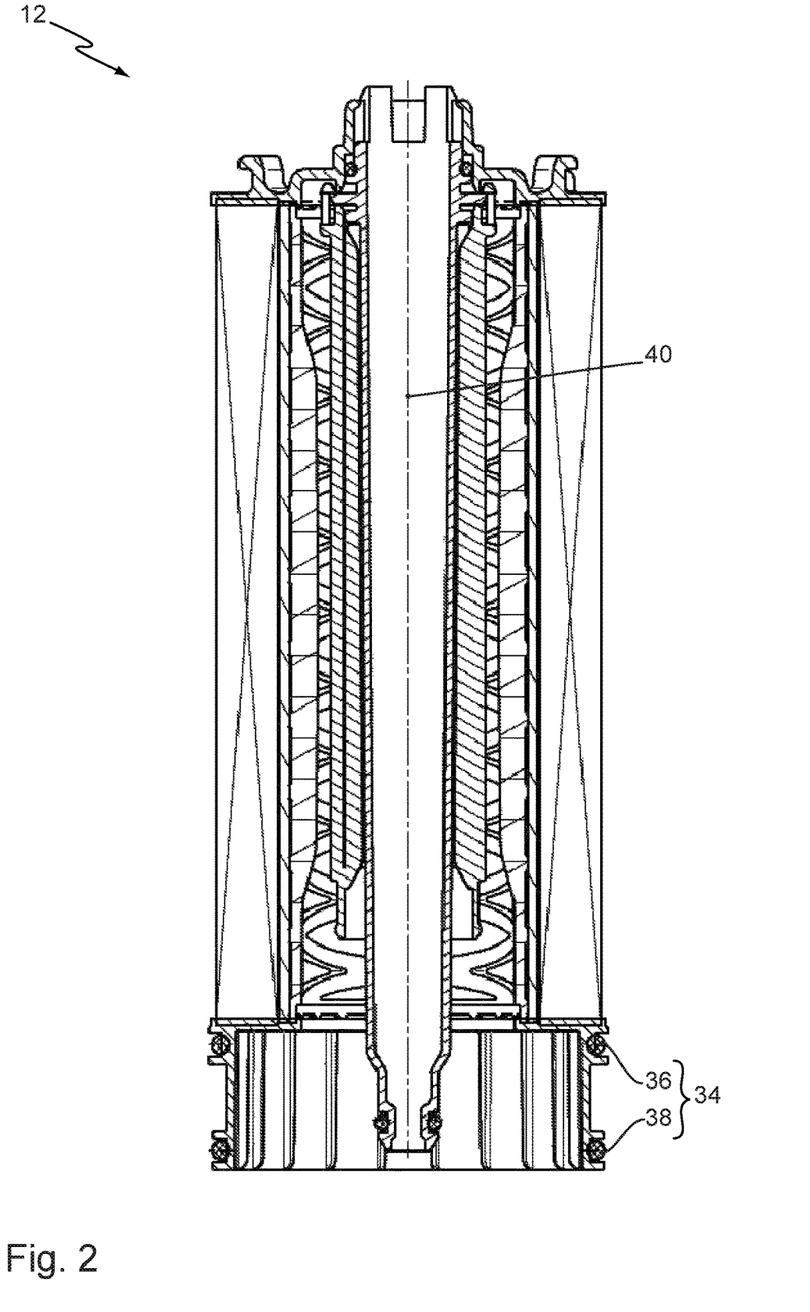
FIG. 2 shows a longitudinal section through the first filter element according to FIG. 1.

FIG. 2 shows the first filter element 12. From a comparison of FIGS. 1 and 2 it can be seen that the first filter element 12 is sealed, towards the filter housing 14 (see FIG. 1), at one end by means of a non-return valve seal 32 (see FIG. 1) of the non-return valve 26 and at the other end by means of a double seal 34 (see FIG. 2). The double seal 32 comprises a first seal 36 and a second seal 38 which are both designed in the form of O-rings. Furthermore, it can be seen from FIG. 2 that the first filter element 12 is formed axially symmetrically with respect to the longitudinal axis 40 of the filter element 40.

Figure 3:
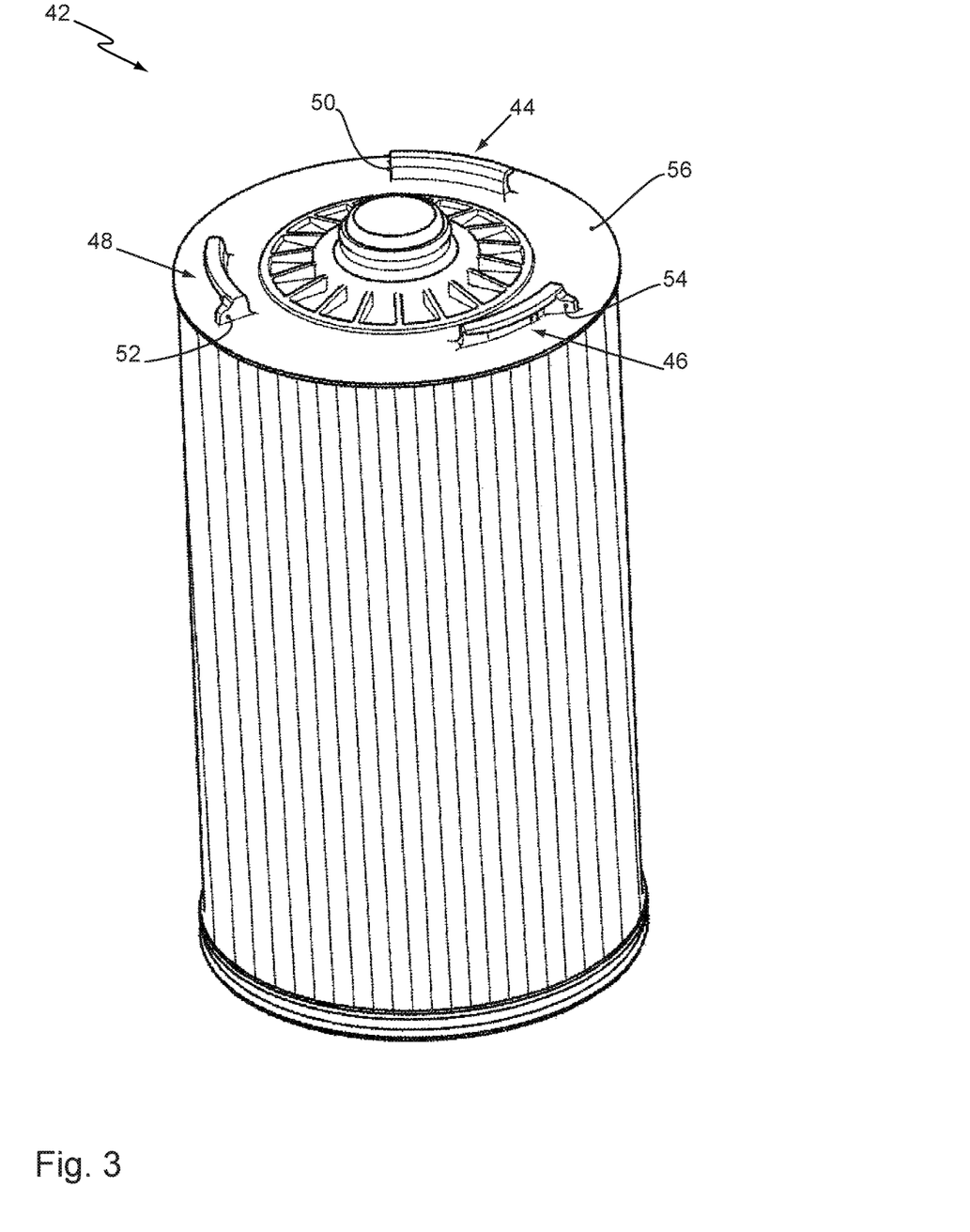
FIG. 3 shows a perspective view of a second filter element for a second fuel filter (not shown)

FIG. 3 shows a second filter element 42 of a second fuel filter (not shown). It can be seen from FIG. 3 that the second filter element 42 has bayonet projections 44, 46, 48. The bayonet projections 44, 46, 48 in each case have a stop 50, 52, 54. The stops 50, 52, 54 are designed in such a way that bayonet receptacles (not shown), which are arranged or formed in a cover of a filter housing, are locked with the bayonet projections 44, 46, 48 when the cover is unscrewed. The second filter element can then be removed together with the cover. Reference is made to this again in the description of FIG. 6. The bayonet projections 44, 46, 48 are formed in one piece with a first end disc 56 of the second filter element 42.

Figure 4:
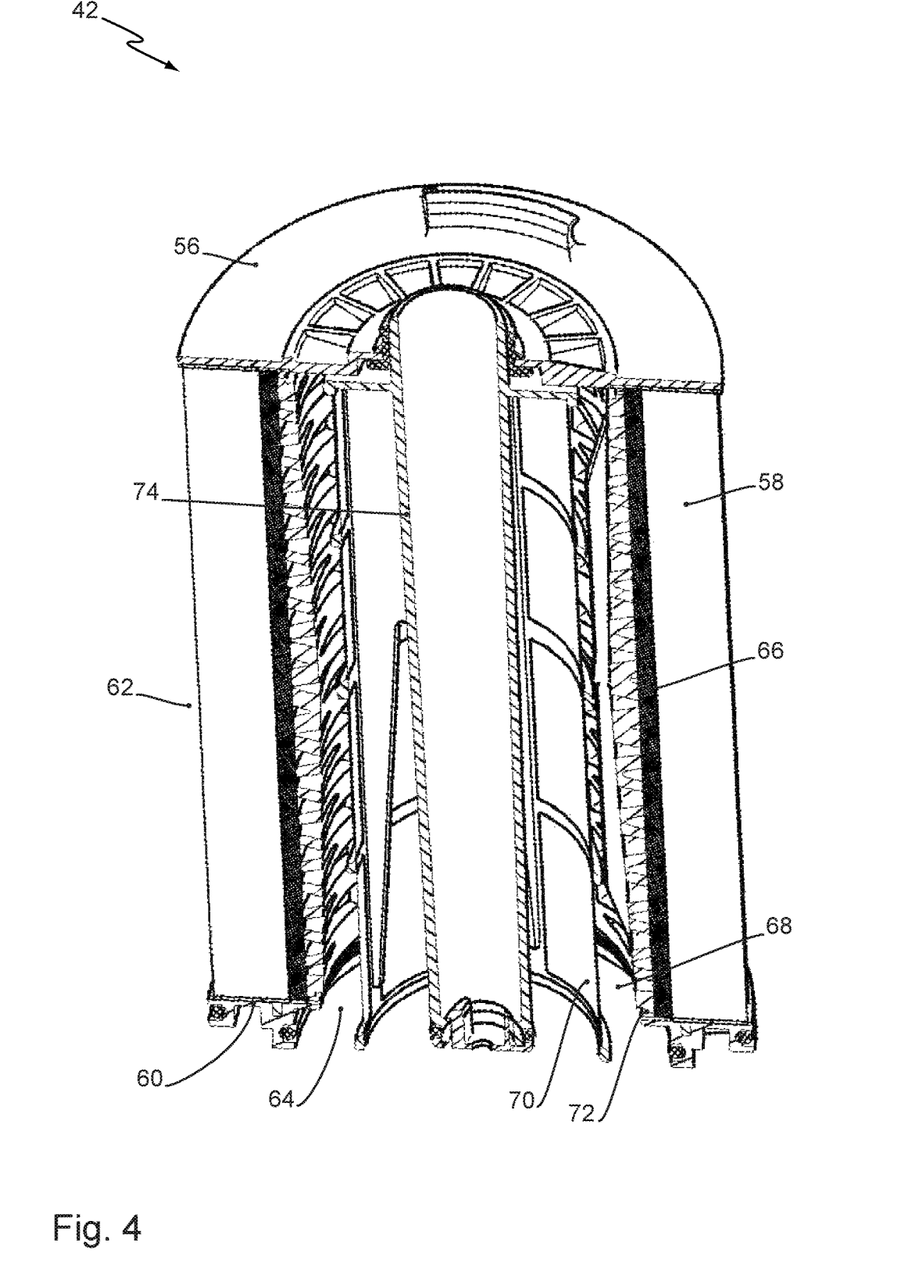
FIG. 4 shows a perspective representation of a longitudinal section of the second filter element according to FIG. 3.

FIG. 4 shows the second filter element 42 in a sectional view. It is clear from FIG. 4 that the filter elements according to the invention, in this case the second filter element 42, are designed for multi-stage cleaning of a fuel.

For multi-stage cleaning the second filter element 42 has a particle filter medium 58 which is arranged between the first end disc 56 and a second end disc 60. The particle filter medium 58 is welded to the end discs 56, 60 for fluid-tight separation of an input side 62 from a output side 64.

For multi-stage water separation the second filter element 42 comprises a coalescer medium 66, a sediment gap 68 and a final separating screen 70. The particle filter medium 58 is supported, together with the coalescer medium 66, on a support member 72 of the second filter element 42, in order to withstand the pressure exerted by the fuel against the second filter element 42.

A ventilation pipe 74 extends centrally in the longitudinal direction of the filter element. The ventilation pipe 74 is designed in the form of a support pipe which projects beyond the first end disc 56, so that it is easily fluidically contactable at the top.

Figure 5:
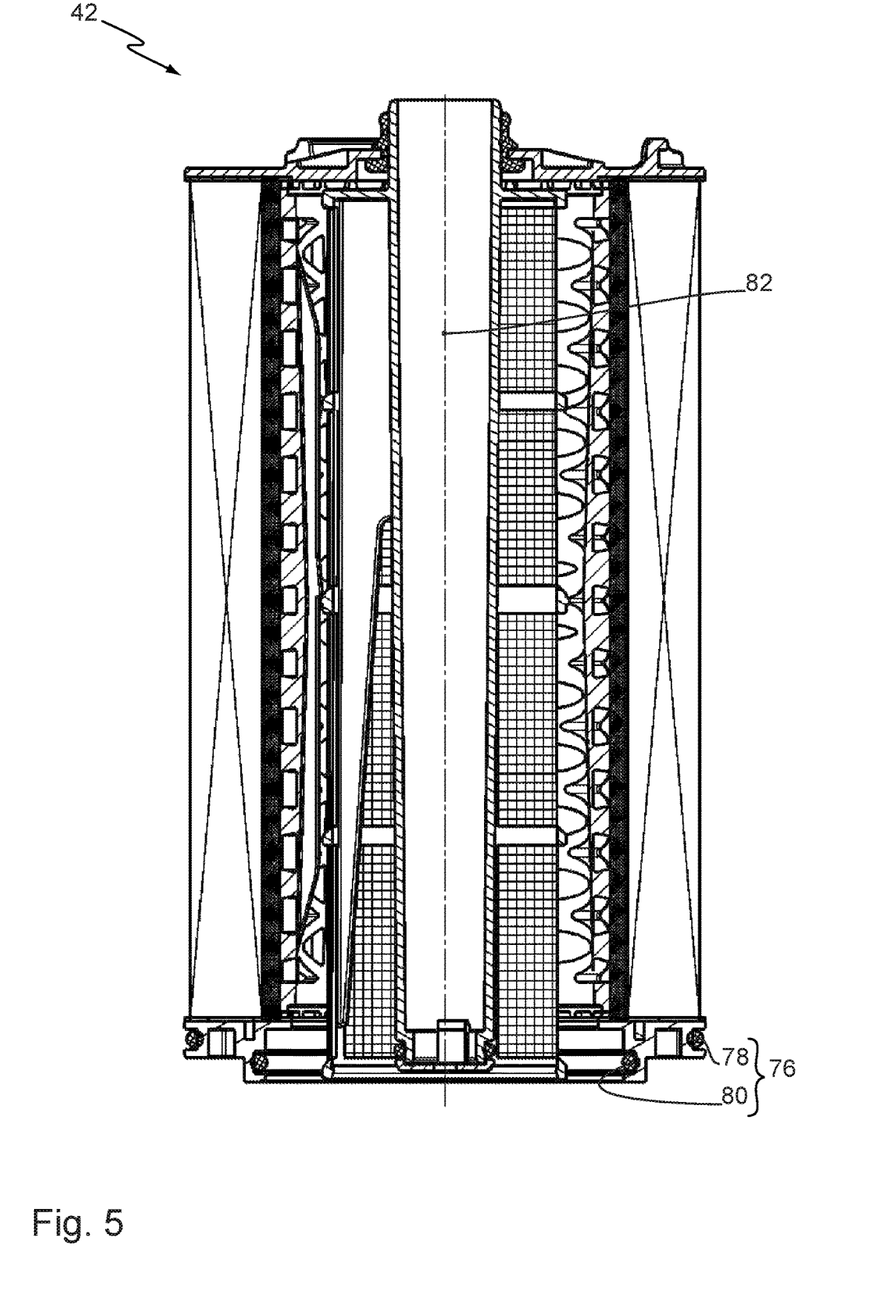
FIG. 5 shows a plan view of a further longitudinal section of the second filter element according to FIG. 3.

FIG. 5 shows a further sectional view of the second filter element 42. It can be seen from FIG. 5 that the second filter element 42 has at the underside a double seal 76 with a first seal 78 and a second seal 80. The first seal 78 seals the second filter element 42 radially with respect to the longitudinal axis of the filter element 82 towards the outside, whereas the second seal 80 seals the second filter element 42 radially inwards towards the longitudinal axis of the filter element 82. Thus the normal forces exerted on the first seal 78 and the second seal 80 during insertion of the second filter element 42 act in opposite directions, namely towards the longitudinal axis of the filter element 82 (in the case of the first seal 78) and away from the longitudinal axis of the filter element 82 (in the case of the second seal 80). The normal forces acting in opposite directions provide partial force compensation and as a result cause less mechanical loading of the second filter element 42.

Figure 6:
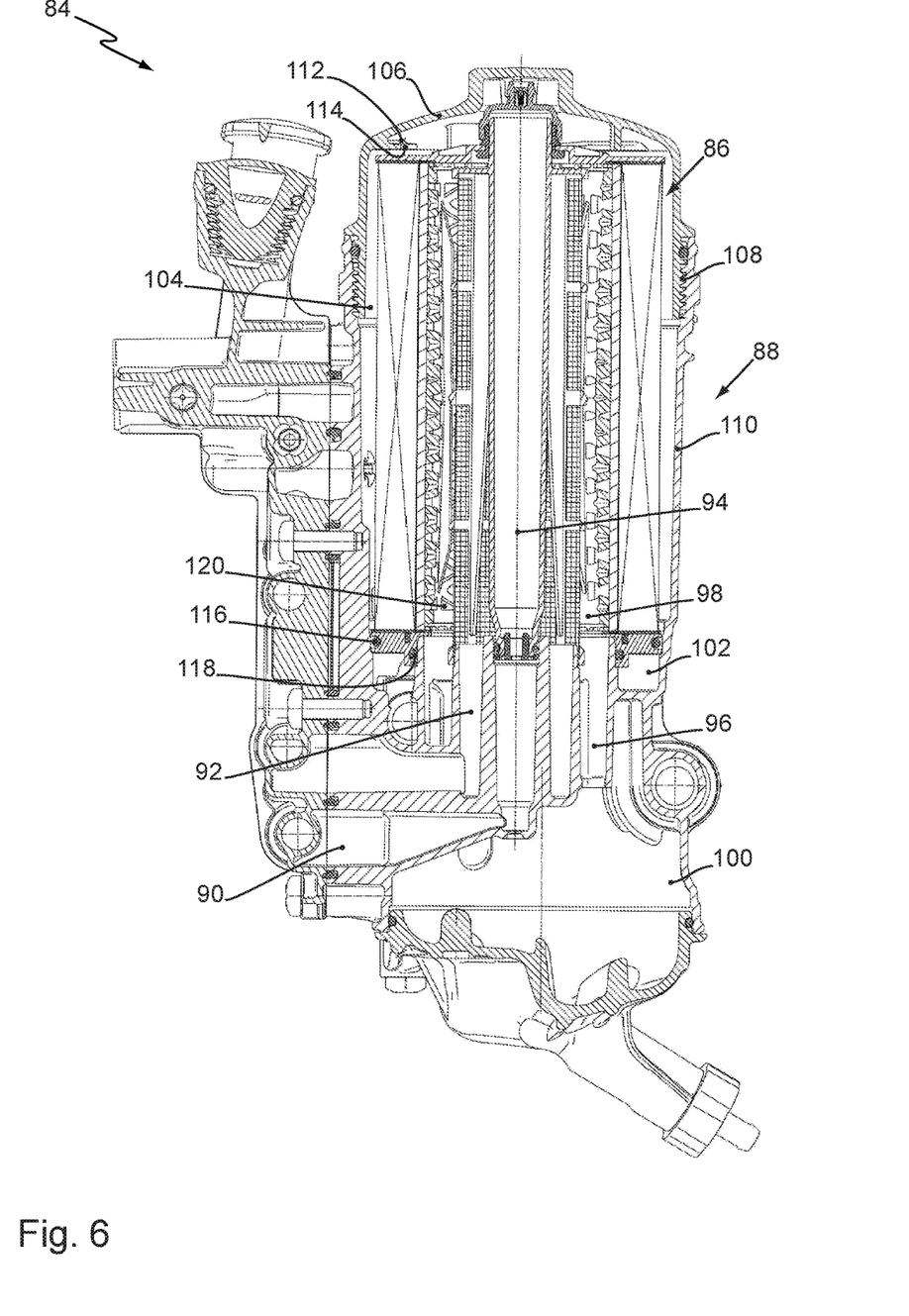
FIG. 6 shows a longitudinal section through a third fuel filter having a third filter element.

FIG. 6 shows a third fuel filter 84 with a third filter element 86. The third filter element 86 is arranged in a filter housing 88. The filter housing 88 has a return pipe 90 for returning air into a tank (not shown). A fuel outlet 92 of the filter housing 88 serves to discharge cleaned fuel to an internal combustion engine (not shown). The fuel outlet 92 is substantially annular with respect to a longitudinal axis of the filter element 94. The fuel outlet 92 is surrounded by an annular water outlet 96, into which a sediment gap 98 of the third filter element 86 opens or which is fluidically connected to the sediment gap 98. The water outlet 96 opens into a water collecting chamber 100 or is fluidically connected to the water collecting chamber 100.

Furthermore, the filter housing 88 has a drainage channel 102. The drainage channel 102 serves for returning fuel from an input side 104 of the third fuel filter 84 to the tank (not shown) during changing of the third filter element 86.

For changing of the third filter element 86, a cover 106 of the filter housing 88, which is connected via a threaded connection 108, in this case a right-handed threaded connection, to a filter housing member 110 of the filter housing 88, is unscrewed from the filter housing 110. During unscrewing of the cover 106, i.e. during rotation of the cover 106 anticlockwise (in plan view), bayonet projections of the third filter element 86 engage behind respective bayonet receptacles of the cover 106. In this connection FIG. 6 shows a first bayonet projection 112 which engages behind a first bayonet receptacle 114. The cover 106 is rotated until it reaches a stop (cf. stops 50, 52, 54 in FIG. 3). By further rotation or unscrewing of the cover 106 the third filter element 86 is also rotated and thus can be removed, together with the cover 106, from the filter housing member 110. Thus the cover 106 serves as a grip for the third filter element 86.

During the removal of the third filter element 86, first of all a first seal 116 of the third filter element 86 opens the fluidic connection between the input side 104 and the drainage channel 102, so that fuel can drain from the input side 104 via the drainage channel 102. Only after this, that is to say after further movement of the third filter element 86 upwards, a second seal 118 opens the connection between the output side 120 and the drainage channel 102, so that a contamination of the output side 120 by unfiltered fuel from the input side is avoided. Thus the seals 116, 118 constitute a double seal which sequentially opens the drainage channel 102 during the removal of the third filter element 86.

Figure 7:
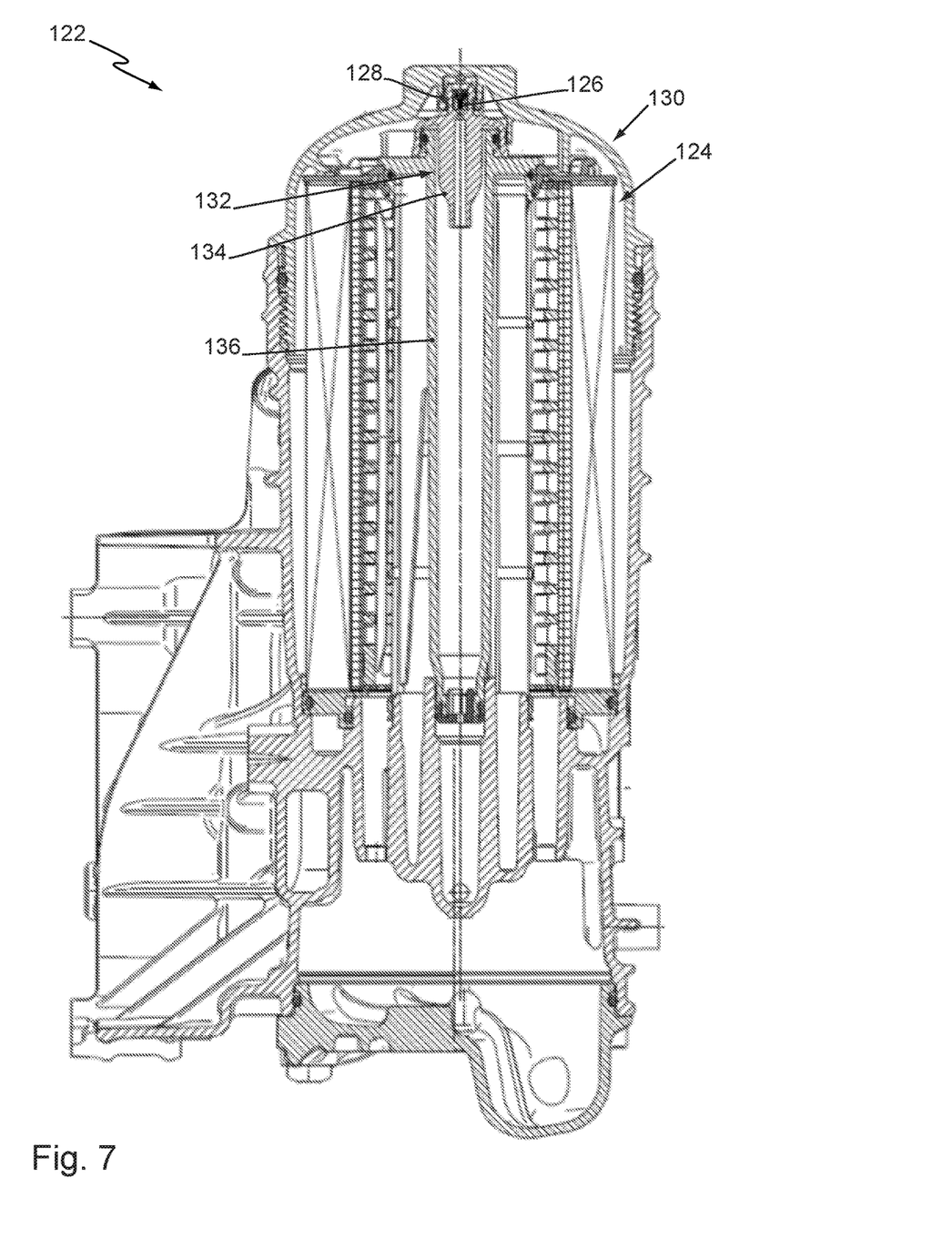
FIG. 7 shows a longitudinal section through a fourth fuel filter having a fourth filter element.

FIG. 7 shows a fourth fuel filter 122. The fourth fuel filter 122 comprises a fourth filter element 124. The fourth fuel filter 122 has a non-return valve 126, which is fastened by means of a snap connection 128 to a cover 130 of the fourth fuel filter 122. In this case the non-return valve 126 is arranged in a fastening element 132. The fastening element 132 has at one end a cone 134 for simple adjustment of the fastening element 132—and as a result the cover 130—to the fourth filter element 124. During the installation of the cover 130 the cone 134 can be easily introduced into a ventilation pipe 136 of the fourth filter element 124. As a result the installation of the fourth fuel filter 122 is particularly user-friendly.

Figure 8:
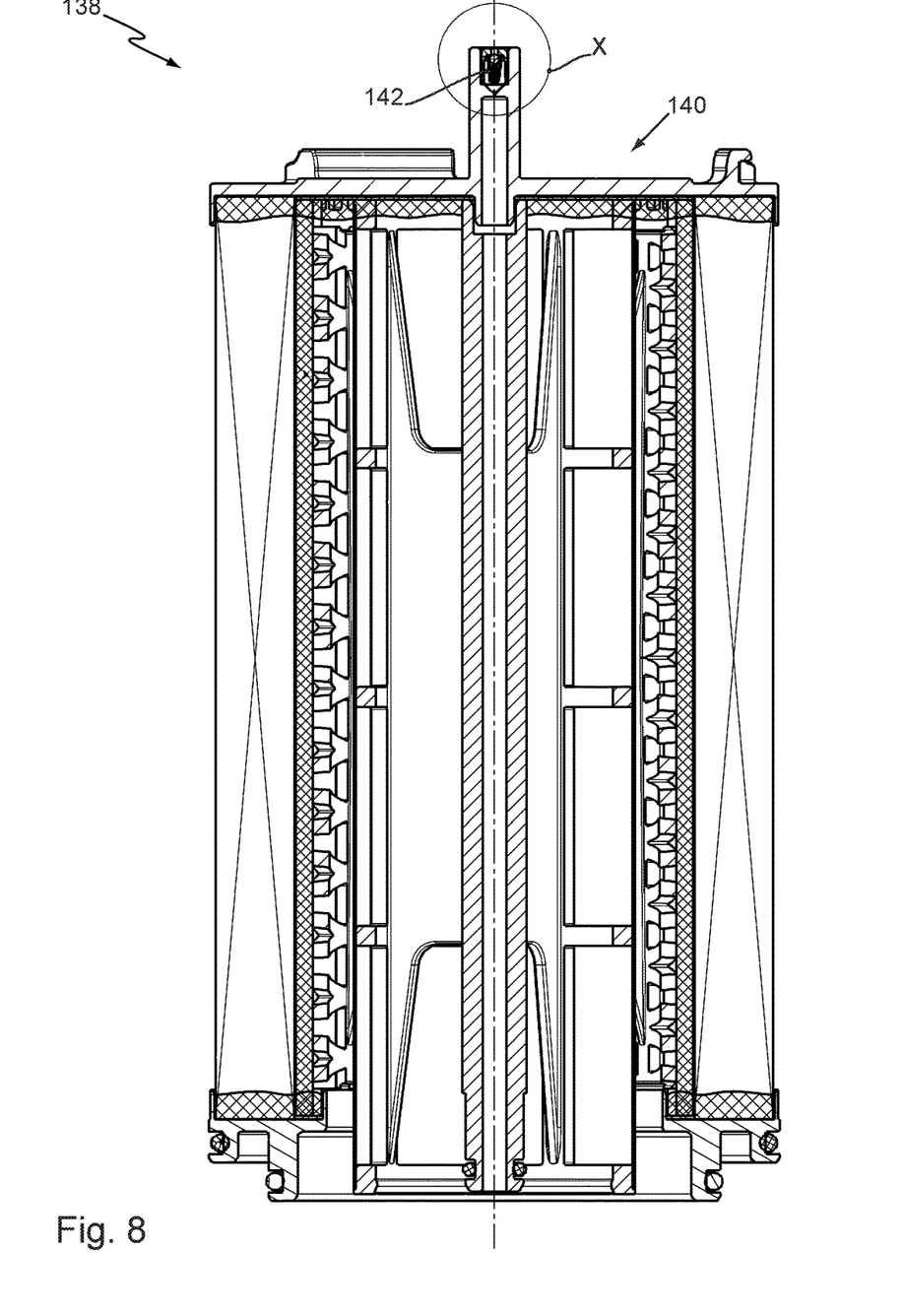
FIG. 8 shows a longitudinal section through a fifth filter element.

FIG. 8 shows a fifth filter element 138. The fifth filter element 138 has a first end disc 140 which comprises a non-return valve 142. FIG. 8 shows a plan view of a longitudinal section along the plane XIII-XIII according to FIG. 9.

Figure 9:
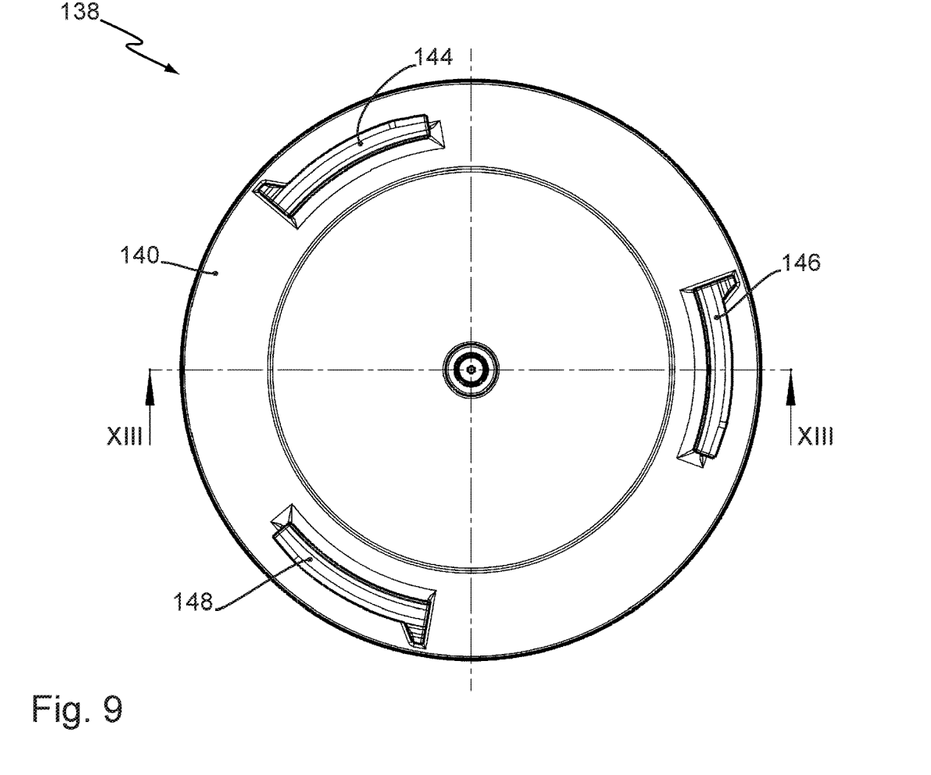
FIG. 9 shows a plan view of the fifth filter element according to FIG. 8.

FIG. 9 shows a plan view of the fifth filter element 138. It can be seen from FIG. 9 that on the first end disc 140 bayonet projections 144, 146, 148 are formed which, during screwing on of a cover (not shown), engage in the bayonet receptacles (not shown) on the cover, so that the fifth filter element 138 together with the cover can be removed from a filter housing member (not shown).

Figure 10:
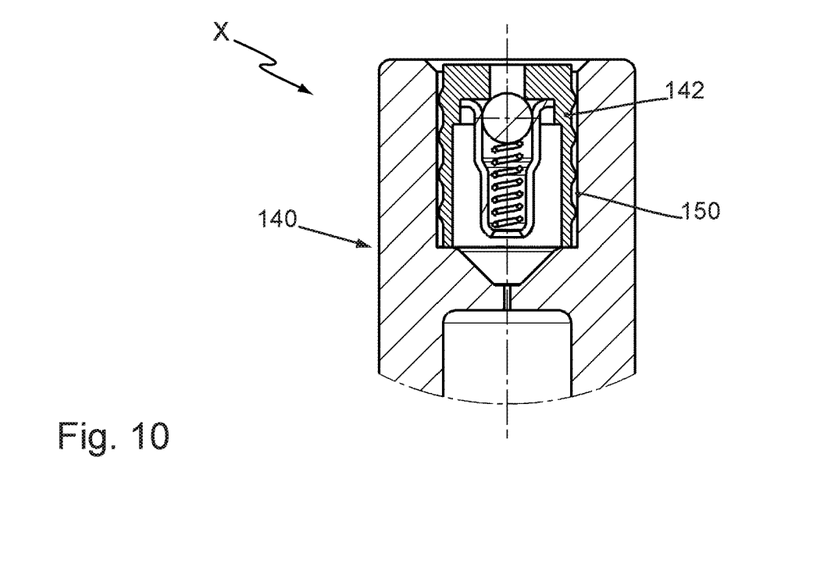
FIG. 10 shows a sectional detail view of the area X of the fifth filter element according to FIG. 8.

FIG. 10 shows an enlarged view of the area X according to FIG. 8. It can be seen from FIG. 10 that the non-return valve 142 is arranged with a press fit in a recess 150 in the first end disc 140. This enables a particularly cost-effective production of the fifth filter element 138 (see FIG. 8).

To summarize, the invention relates to a multi-stage cleaning filter element as well as a fuel filter with such a filter element. The filter element has a particle filter medium, a coalescer medium, a sediment gap and a final separating screen. The filter element is arranged in a filter housing of the fuel filter which comprises a filter housing member and a cover screwed onto the filter housing member. For convenient changing of the filter element the fuel filter is formed in such a way that at least one bayonet projection of the filter element engages behind a corresponding bayonet receptacle during unscrewing of the cover from the filter housing member, so that the cover—together with the filter element arranged thereon by means of the bayonet connection—can be removed. The filter element is preferably a filter element with a ventilation pipe for ventilation of the fuel filter.

What is claimed is:

1. A filter element for a fuel filter of a motor vehicle, wherein
the filter element is annular, and surrounds a longitudinal axis extending through a center of the filter element, the filter element configured and adapted to be inserted into a filter housing of the fuel filter; and
the filter element for multi-stage cleaning of a fuel includes:
a particle filter medium;
a coalescer medium;
a tubular support member on which the particle filter medium and the coalescer medium are supported'
a sediment gap;
a final separating element having a final separating screen; and
a first end plate on a first axial end of the filter element, and a second end plate on an opposite second axial end of the filter element, wherein the particle filter medium and the coalescer medium are fixed onto the first end plate and onto the second end plate;
wherein the final separating element extends from an interior of the filter element, and projects outwardly beyond the particle filter medium at the second axial end of the filter element;
wherein the first end plate of the filter element has a plurality of bayonet projections configured to engage behind a bayonet receptacle in a cover of the filter housing;
wherein the projections have a stop wall formed with the bayonet projections and extending radially outwardly to form a rotation stop, stopping rotation relative to the bayonet receptacle when engaged;
wherein the filter element includes a ventilation pipe, the ventilation pipe is tubular having an outer tubular wall terminating at a first open end face and an opposite second open end face, the open end faces opening axially to an exterior of the ventilation pipe,
wherein the ventilation pipe is arranged on and extending along the longitudinal axis in an interior of the filter element, the outer tubular wall of the ventilation pipe extending from the interior through the first end plate and projecting outwardly beyond the first end plate to terminate at the first open end face.

2. The filter element according to claim 1, wherein the particle filter medium is arranged between the first end plate and a second end plate of the filter element.

3. The filter element according to claim 2, wherein
the filter element includes a double seal arranged on the second end plate, the double seal having:
a first annular seal arranged at a radially outer side of the second end plate and configured to seal radially outwardly against an interior of the filter housing;
a second annular seal arranged axially outwardly from the first annular seal and radially inwardly from the first annular seal, the second annular seal configured to seal radially inwardly
wherein the double seal is arranged on the second end plate of the filter element which is arranged at the bottom in the installation position of the filter element.

4. A fuel filter, comprising:
a filter housing; and
a filter element, wherein
the filter element is annular, and surrounds a longitudinal axis extending through a center of the filter element, the filter element configured and adapted to be inserted into the filter housing; and
the filter element for multi-stage cleaning of a fuel includes:
a particle filter medium;
a coalescer medium;
a sediment gap; and
a final separating element having a final separating screen;
a first end plate on a first axial end of the filter element, and a second end plate on an opposite second axial end of the filter element, wherein the particle filter medium and the coalescer medium are fixed onto the first end plate and onto the second end plate;
wherein the final separating element extends from an interior of the filter element, and projects outwardly beyond the particle filter medium at the second axial end of the filter element;
wherein the first end plate of the filter element has a plurality of bayonet projections configured to engage behind a bayonet receptacle in a cover of the filter housing;
wherein the projections have a stop wall formed with the bayonet projections and extending radially outwardly to form a rotation stop, stopping rotation relative to the bayonet receptacle when engaged;
wherein the filter element includes a ventilation pipe arranged on and extending along the longitudinal axis in an interior of the filter element, the ventilation pipe extending from the interior through the first end plate and projecting outwardly beyond the first end plate;
wherein the cover can be screwed onto a filter housing; and
the cover has on an inside the bayonet receptacle which configured such that the bayonet projections engage in the bayonet receptacle when the cover is unscrewed from the filter housing member;
wherein the projections have a stop wall formed with the bayonet projections and extending radially outwardly to form a rotation stop, stopping rotation relative to the bayonet receptacle when engaged;
wherein the filter element includes a ventilation pipe, the ventilation pipe is tubular having an outer tubular wall terminating at a first open end face and an opposite second open end face, the open end faces opening axially to an exterior of the ventilation pipe,
wherein the ventilation pipe is arranged on and extending along the longitudinal axis in an interior of the filter element, the outer tubular wall of the ventilation pipe extending from the interior through the first end plate and projecting outwardly beyond the first end plate to terminate at the first open end face.

5. The fuel filter according to claim 4, wherein the fuel filter has at one end on the ventilation pipe a non-return valve which configured to shut off in the event of a flow being interrupted.

6. The fuel filter according to claim 5, wherein the non-return valve is fastened by a snap connection, in a fluid-tight manner, in the fuel filter.

7. The fuel filter according to claim 5, wherein the non-return valve is fastened directly to the cover of the filter housing, the non-return value inserted into an interior of the ventilation pipe through the first open end face.

8. The fuel filter according to claim 4, wherein the filter housing has a drainage channel for draining fuel during removal of the filter element from the filter housing.

9. The fuel filter according to claim 8, wherein the filter element includes a double seal arranged on a second end plate, the double seal having:
a first annular seal arranged at a radially outer side of the second end plate and configured to seal radially outwardly against an interior of the filter housing;
a second annular seal arranged axially outwardly from the first annular seal and radially inwardly from the first annular seal, the second annular seal configured to seal radially inwardly;
wherein the double seal is arranged on the second end plate of the filter element which is arranged at the bottom in the installation position of the filter element;
wherein the drainage channel is arranged or formed in such a way that when the filter element is removed from the filter housing the second annular seal of the double seal seals the connection to an output side of the fuel filter for longer than the first seal of the double seal seals the connection to an input side of the fuel filter.

* * * * *